United States Patent [19]

Fukuoka et al.

[11] 4,123,257

[45] Oct. 31, 1978

[54] METHOD OF TREATING A PLATING SLUDGE

[75] Inventors: Hiroshi Fukuoka, Tokuyama; Teruhiko Kameyama, Shinnanyo; Yoshio Tanaka, Tokuyama; Hideyo Suzuki, Yokohama; Kimiaki Imai, Narashino, all of Japan

[73] Assignees: Nisshin Steel Company Ltd.; Japan Metals & Chemicals, Co., Ltd., both of Japan

[21] Appl. No.: 806,096

[22] Filed: Jun. 13, 1977

[30] Foreign Application Priority Data

Jun. 25, 1976 [JP] Japan .................................. 51-74377

[51] Int. Cl.² .......................... C21B 13/00; C22B 1/24
[52] U.S. Cl. ............................................. 75/40; 75/3; 75/25; 75/29; 75/44 S; 264/111; 264/117; 264/122
[58] Field of Search ..................... 75/3, 4, 5, 29, 10 R, 75/11, 25, 99, 43, 44 R, 40, 41, 44 S; 73/313 P, 313 R; 264/111, 117, 122

[56] References Cited

U.S. PATENT DOCUMENTS

| | | | |
|---|---|---|---|
| 2,085,178 | 6/1937 | Acken | 75/25 |
| 2,277,663 | 3/1942 | Francis et al. | 75/25 |
| 2,417,493 | 3/1947 | Holz | 75/25 |
| 3,870,507 | 3/1975 | Allen | 75/25 |
| 4,004,918 | 1/1977 | Fukuoka et al. | 75/25 |
| 4,047,939 | 9/1977 | Morrison | 75/99 |

FOREIGN PATENT DOCUMENTS

| | | | |
|---|---|---|---|
| 46-13,491 | 4/1971 | Japan | 75/25 |
| 46-15,207 | 4/1971 | Japan | 75/25 |
| 49-23,448 | 6/1974 | Japan | 75/3 |
| 5,288,578 | 7/1977 | Japan. | |
| 726,243 | 3/1955 | United Kingdom | 75/3 |
| 420,670 | 2/1972 | U.S.S.R. | 75/3 |

Primary Examiner—L. Dewayne Rutledge
Assistant Examiner—Michael L. Lewis
Attorney, Agent, or Firm—Stevens, Davis, Miller & Mosher

[57] ABSTRACT

A method of treating a plating sludge is disclosed, wherein a plating sludge, whose water content is decreased to not higher than 10% by weight, is mixed with scale, dust, both of which are formed in the alloy steel-making step, a binder and a carbonaceous material, and water is added to the mixture to adjust the water content of the mixture to 7–30% by weight, the mixture is kneaded and then molded into a briquet, and the briquet is subjected to a strength-improving treatment. The resulting briquet can be used as a raw material for ferroalloy. When the briquet is subjected to a reduction smelting to recover a metal, the metal can be used as a raw material for alloy steel.

16 Claims, 1 Drawing Figure

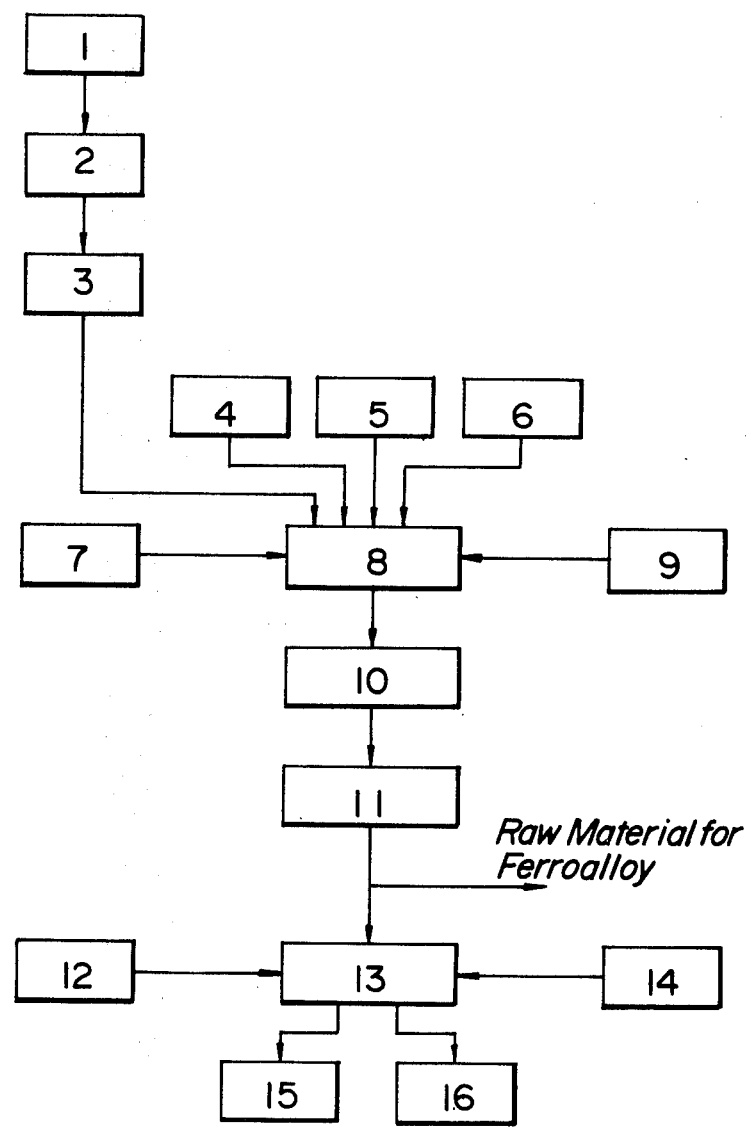

METHOD OF TREATING A PLATING SLUDGE

BACKGROUND OF THE INVENTION

1. Field of the Invention

The present invention relates to a method of treating a plating sludge. More particularly, the present invention relates to a method of treating a plating sludge, wherein a hydrated plating sludge produced during the treatment of waste liquor formed in the plating of various metals is dehydrated and dried, if necessary, together with a hydrated pickling sludge, to produce a plating sludge; the sludge is mixed with scale and dust formed in the production step of alloy steel; the mixture is molded into a briquet; and the briquet is used as a material for ferroalloy or is further subjected to a reduction smelting together with a carbonaceous reducing agent in a reduction-smelting furnace to recover valuable metals.

The term "plating sludge" herein used includes a sludge obtained by subjecting a hydrated sludge which has been formed during the treatment of waste liquor or metal plating to dehydration and drying treatments with or without sludge formed during pickling.

2. Description of the Prior Art

When waste liquor of metal plating is neutralized and then subjected to dehydration and drying treatments, a plating sludge can be separated. However, there have not hitherto been known effective methods of treating the resulting plating sludge, and almost of the sludge is used in the land-fill as an industrial waste. Such industrial waste causes public nuisance and various methods are proposed in order to solve this problem. However, all of the hitherto proposed methods have drawbacks in the treatment of the plating sludge in a commercial scale, and therefore almost of the sludge is stacked and left as it is or is solidifed by concrete and used for landfill.

While, the plating sludge contains a large amount of valuable metals, such as Ni, Cr, Fe and the like, and it is not preferable from the viewpoint of resource saving in our country having poor resources to discard these metals after these metals are converted into harmless state. Therefore, it is very important to establish an effective method of treating plating sludge, which can recover the valuable metals.

The inventors have made various investigations in order to solve the above described problems, and proposed in Japanese Patent Application No. 5,045/76 (laid open July 25, 1977 as Japanese Patent Laid Open Application No. 88,578/77) a method of treating plating sludge, which can recover useful metals from the sludge. In the method of treating plating sludge disclosed in Japanese Patent Application No. 5,045/76, a hydrated sludge obtained from a waste liquor of metal plating is dehydrated and dried to decrease the water content to 2-20% by weight; the dried sludge was added with 2-15% by weight of an organic binder or not larger than 5% by weight of an inorganic binder or both of them, the amounts of the organic and inorganic binders being based on the solid content of the sludge, and further with water to adjust the water content of the resulting mixture to 8-30% by weight; the mixture is fully kneaded; the homogeneously kneaded mixture is molded into a briquet by means of a briquet-molding machine; the molded briquet is dried by a dryer or cured; and the dried or cured briquet is used as a raw material for ferroalloy, or is further charged into a reduction-smelting furnace together with a carbonaceous reducing agent and subjected to a reduction smelting in the furnace to recover a metal, and the metal is used as a raw material for high alloy steel.

Valuable metals contained in plating sludge can be recovered by the above described treating method, but this method has still the following drawbacks.

1. Since the plating sludge has a high phosphorus content, the recovered metal has a high phosphorus content.
2. Since the dried plating sludge itself is poor in the moldability, the yield in the molding by a briquet-molding machine is low, and further the briquet is poor in the strength and causes troubles in the subsequent treatments.

The inventors have succeeded in overcoming the above described drawbacks.

SUMMARY OF THE INVENTION

The present invention provides a method of treating a plating sludge, wherein a dried plating sludge is kneaded together with various dusts and scales formed in an alloy steel-making step, a binder, a carbonaceous material and water, the homogeneously kneaded mixture is press molded into a briquet having a high strength, and then the briquet is used as a raw material for ferroalloy or is further subjected to a dry system reduction smelting by a reduction-smelting furnace to recover metal having a low phosphorus content.

BRIEF DESCRIPTION OF THE DRAWING

The single FIGURE is a schematic block diagram illustrating the method of treating a plating sludge according to the present invention.

DESCRIPTION OF THE PREFERRED EMBODIMENTS

The present invention will be explained referring to the FIGURE. In the FIGURE, the numeral 1 represents a hydrated plating sludge obtained by neutralizing a waste liquor of metal plating and agglomerating the resulting precipitate, 2: dehydrator for dehydrating the hydrated plating sludge 1, 3: a dryer for drying the plating sludge 1 dehydrated by the dehydrator 2, 4 and 5: dust and scale formed during an alloy steel-making step respectively, 6: carbonaceous material, as the carbonaceous material, coal powder or coke breeze or a mixture thereof is generally used, 7: organic and/or inorganic binders, as the binder, pulp waste liquor, bentonite, molasses, CMC, cement and the like are used, 8: kneader, 9: water, 10: agglomerating machine, such as briquet-molding machine, for molding the mixture homogeneously kneaded in the kneader 8 into a briquet, 11: strength-improving machine for improving the strength of the briquet, as the strength-improving machine, when cement is not used as a binder 7, a dryer may be used but when cement is used as a binder 7, there is used an apparatus for carrying out natural curing at low temperature or a tunnel furnace for carrying out steam curing at low temperature, 13: reduction-smelting furnace for carrying out the dry system reduction smelting of the briquet strengthened by the strength-improving machine 11 to recover metal, 12 and 14: carbonaceous reducing agent and flux respectively, which are charged into the reduction-smelting furnace 13 at the dry system reduction smelting of the briquet, 15: metal recovered in the reduction-smelting furnace 13, and 16: slag.

The method of treating plating sludge consisting of the above described steps according to the present invention will be explained hereinafter.

When a hydrated plating sludge 1 formed by neutralizing a waste liquor of metal plating and agglomerating the resulting precipitate is intended to dry as such, a large amount of fuel must be used in a dryer 3, and moreover the feeding of the hydrated plating sludge 1 into the dryer 3 is difficult. Therefore, after the hydrated plating sludge 1 is dehydrated by a dehydrator 2 to decrease the water content to about 50% by weight, the sludge 1 is fed into the dryer 3 and dried therein to produce a powder or granular plating sludge having a water content of not higher than 10% by weight. To 100 parts by weight of the dried plating sludge having a water content of not higher than 10% by weight is mixed with 10–200 parts by weight of dust 4 and 10–100 parts by weight of scale 5, both of which are formed in the alloy steel-making step. There are the following objects in the addition of the dust 4 and scale 5 to the dried plating sludge having a water content of not higher than 10% by weight. The first object of this addition is as follows. The plating sludge contains not only useful metals as a raw material for ferroalloy, but also a relatively large amount of Zn, S, Cu, P and the like, which are harmful elements as a raw material for ferroalloy, as compared with natural ore for ferroalloy, and the plating sludge cannot be used alone as a raw material for ferroalloy. Therefore, the harmful elements are diluted into harmless state. The second object of the addition of the dust 4 and scale 5 to the dried plating sludge is as follows. The dried plating sludge is present in the form of fine particles consisting mainly of metal hydroxide formed by the neutralization of waste liquor of metal plating, and the sludge itself is poor in the moldability and cannot be made into large briquets having a high strength. Therefore, the dried plating sludge is mixed with scale 5 as an aggregate and further with dust 4 in order to adjust and improve the grain size distribution, whereby the strength of molded briquet is increased. In addition to the above described two objects, the dust 4 and scale 5 are added to the dried plating sludge in order to adjust the ingredients of the plating sludge and to treat the sludge in a larger scale, so that the treatment can be carried out in a commercial scale.

In the dust 4 and scale 5 to be mixed with the dried plating sludge, the dust 4 had been formed in a dry state having a water content of not higher than 10% by weight, and it is not necessary to dry the dust 4. Further, the water content of the scale 5 can be easily decreased to not higher than 10% by weight through a simple filtering, and it is not necessary to dry the scale 5. The reason why the water content of the dried plating sludge is limited to not higher than 10% by weight is that, when the water content exceeds 10% by weight, it is difficult to adjust the amount of water in the following kneading step, and the molding operation becomes difficult. Into a kneader 8 are charged the dried plating sludge, whose water content has been decreased to not higher than 10% by weight as described above, the dust 4 formed in dry state, the scale 5, whose water content has been decreased to not higher than 10% by weight by a simple filtering, and further a carbonaceous material 6 and a binder 7. Then, water 9 is added to the resulting mixture to adjust the water content of the mixture to 7–30% by weight, and the resulting mixture is fully kneaded in the kneader 8. In this case, as the dried plating sludge, a mixture of a plating sludge and a pickling sludge produced in the following manner can be also effectively used. When a dried plating sludge obtained by merely dehydrating and drying a hydrated plating sludge alone has a high phosphorus content, after a hydrated pickling sludge having a low phosphorus content, which has been formed in the alloy steel-making step, is dehydrated by a dehydrator and dried by a dryer to decrease the water content to not higher than 10% by weight in the same manner as described in the case of drying the plating sludge 1, the dried pickling sludge may be mixed with the dried plating sludge 1 having a water content of not higher than 10% by weight. Alternatively, after a hydrated plating sludge 1 is mixed with a hydrated pickling sludge, and the resulting mixture may be dehydrated by a dehydrator 2 and dried by a dryer 3 to decrease the water content to not higher than 10% by weight. When a plating sludge is produced from a hydrated plating sludge and a hydrated pickling sludge, the amount of the hydrated pickling sludge to be mixed with the hydrated plating sludge should be determined depending upon the phosphorus content of the hydrated plating sludge.

In the above described kneading, the scale 5 is used as an aggregate of the resulting homogeneously kneaded mixture. The addition amount of the scale 5 is 10–100 parts by weight based on 100 parts by weight of the plating sludge charged into the kneader 8. The reason why the addition amount of the scale 5 is limited to 10–100 parts by weight is as follows. When the amount of the scale 5 is less than 10 parts by weight, the briquet obtained by molding the homogeneously kneaded mixture is poor in the strength, and the scale 5 is not effective as an aggregate. While, even when the amount of the scale 5 exceeds 100 parts by weight, the effect of the scale 5 as an aggregate does not increase.

The dust 4 is used in order to give a sufficiently high denseness and a high strength to the molded briquet. The addition amount of the dust 4 is 10–200 parts by weight based on 100 parts by weight of the plating sludge charged into the kneader 8. The reason why the addition amount of the dust 4 is limited to 10–200 parts by weight is as follows. When the amount of the dust 4 is less than 10 parts by weight, a briquet having a sufficiently high denseness cannot be obtained, and the briquet is poor in the strength. While, when the amount of the dust 4 exceeds 200 parts by weight, the homogeneously kneaded mixture is somewhat poor in the moldability and the strength of the molded briquet lowers.

In general, the carbonaceous material 6 consisting of coal powder and/or coke breeze is used in order to improve the strength of the resulting briquet and to improve the reactivity of the briquet at its reduction smelting by incorporating the carbonaceous material 6 into the briquet. The addition amount of the carbonaceous material 6 is not more than 40 parts by weight based on 100 parts by weight of the plating sludge charged into the kneader 8. The reason why the addition amount of the carbonaceous material 6 is limited to not more than 40 parts by weight is that, when the amount of the carbonaceous material 6 exceeds 40 parts by weight, the strength of the resulting briquet is considerably low.

The binder 7 is used in order to improve the bonding ability of the resulting briquet. The addition amount of the binder 7 is 10–100 parts by weight based on 100 parts by weight of the plating sludge charged into the kneader 8. The reason why the addition amount of the binder 7 is limited to 10-100 parts by weight is as follows. When the amount of the binder 7 is less than 10 parts by weight, the binder does not fully exhibit its binding effect, and the bonding of the resulting briquet is insufficient, and further the moldability of the kneaded mixture is poor, and the resulting briquet is poor in the strength. While, when the amount of the binder 7 exceeds 100 parts by weight, the molding operation of the kneaded mixture is difficult and the effect as a binder does not improve effectively, and further the treating cost becomes high, and the use of such large amount of binder is not economic.

Water 9 is used in order to improve the kneading ability of the kneaded mixture and to improve the moldability of the mixture into briquet. The water 9 is used in an amount of 10-200 parts by weight based on 100 parts by weight of the plating sludge so that a mixture to be kneaded contains 7-30% by weight of water. When the water content of a mixture to be kneaded is adjusted to 7-30% by weight, the mixture can be fully kneaded to produce a homogeneously kneaded mixture having proper adhesion and hardness suitable for the proudction of briquet. The reason why the water content of a mixture to be kneaded is limited to 7-30% by weight is as follows. When the water content is less than 7% by weight, the mixture to be kneaded cannot be fully kneaded and the kneaded mixture is difficultly molded into a briquet, and further dust is scattered to make the working environment worse. While, when the water content of the mixture to be kneaded exceeds 30% by weight, the kneaded mixture adheres on the surface of a roll of a briquet-molding machine 10 to make the molding operation difficult, and the resulting briquet is poor in the strength.

The homogeneous mixture obtained by kneading under the above described condition is press molded into a briquet having a certain predetermined shape by a briquet-molding machine 10. The briquet is somewhat dried during the molding, but the resulting briquet still contains about 7-30% by weight of water, and is poor in the strength at low temperature. Therefore, the strength of the briquet is improved by a strength-improving machine 11 in order to use the briquet as a raw material for ferroalloy, or in order to prevent the difficulty in the smelting operation in a reduction smelting furnace 13 due to the breakage of the briquet caused by the sudden evaporation of water at the recovery of metal 15 in the furnace 13.

The strength-improving treatment of the briquet by the strength-improving machine 11 can be carried out as follows. When at least one of pulp waste liquor, bentonite, molasses and CMC is used as a binder, the strength of the briquet may be improved by a drying treatment only. When cement is used as a binder, the briquet is required to be cured by natural curing at low temperature or by steam curing at low temperature in a tunnel furnace.

When a briquet is subjected to a drying treatment as a strength-improving treatment by a strength-improving machine 11 so that the water content of the briquet is not higher than 2% by weight, the crushing strength of the briquet is improved to not lower than 60 kg/one briquet, and the briquet can be easily handled in the following steps.

The strength-improved briquet as described above is used as a raw material for ferroalloy. Alternatively, the briquet is further charged into a reduction-smelting furnace 13 together with a carbonaceous reducing agent 12 and subjected to a dry system reduction smelting in the furnace 13 to recover a metal, and the metal is separated into metal 15 and slug 16, and the metal 15 is used as a valuable metal. In the reduction of a briquet by the use of the carbonaceous reducing agent 12, it is preferable to use flux 14, such as silica, quick lime and the like. As the carbonaceous reducing agent 12, charcoal, coke and the like can be used.

The following examples are given for the purpose of illustration of this invention and are not intended as limitations thereof.

EXAMPLE 1

A waste liquor of nickel plating is neutralized and the precipitate is agglomerated to obtain a hydrated plating sludge containing 82.5% by weight of water. 40 tons of the hydrated plating sludge was dehydrated by means of a filter press to decrease the water content to 52.8% by weight. The sludge was further dried by means of a rotary dryer at a temperature of 330° C. (at the center portion of the dryer) to obtain a plating sludge having a water content of 7.2% by weight.

The following Table 1 shows the chemical composition of the dried plating sludge. Table 2 shows the details of the rotary dryer used in the drying.

Table 1

| Total Cr (%) | Total Ni (%) | Zn (%) | CaO (%) | $SiO_2$ (%) | MgO (%) | $Al_2O_3$ (%) | Total Fe (%) | S (%) | Cu (%) | P (%) |
| --- | --- | --- | --- | --- | --- | --- | --- | --- | --- | --- |
| 1.6 | 20.5 | 0.4 | 1.8 | 23.9 | 1.1 | 2.8 | 2.8 | 0.4 | 0.08 | 0.31 |

Note:
(1) "%" means % by weight based on the dry weight of plating sludge exclusive of water.
(2) The balance of the sum of the ingredients is the amount of oxygen bonded to elements other than Ca, Si, Mg and Al.

Table 2

| | |
| --- | --- |
| Inner diameter of dryer (mm) | 600 |
| Outer diameter of dryer (mm) | 800 |
| Length of dryer (mm) | 4,600 |
| Number of rotation of dryer (r.p.m.) | 3.4 |

Dust formed in a dry state in a steel-making electric furnace at a stainless steel-making step and scale, which had been formed at the hot rolling of stainless steel bloom and from which water had been filtered off, were charged into a kneader together with the above described dehydrated and dried plating sludge. The chemical compositions of the dust and scale are shown in the following Table 3.

Table 3

| | Total Cr (%) | Total Ni (%) | Total Fe (%) | CaO (%) | $SiO_2$ (%) | MgO (%) | $Al_2O_3$ (%) | P (%) | S (%) |
| --- | --- | --- | --- | --- | --- | --- | --- | --- | --- |
| Dust | 5.8 | 0.9 | 23.0 | 22.5 | 7.5 | 11.0 | 1.4 | 0.016 | 0.88 |

Table 3-continued

| | Total Cr (%) | Total Ni (%) | Total Fe (%) | CaO (%) | SiO$_2$ (%) | MgO (%) | Al$_2$O$_3$ (%) | P (%) | S (%) |
|---|---|---|---|---|---|---|---|---|---|
| Scale | 13.9 | 2.2 | 53.1 | — | 5.8 | — | — | 0.02 | 0.04 |

Note:
(1) "%" means % by weight based on the dry weight of dust or scale exclusive of water.
(2) The balance of the sum of the ingredients is the amount of oxygen bonded to elements other than Ca, Si, Mg and Al.

Further, a waste liquor of pulp as a binder and coke breeze as an aggregate were added to the above obtained mixture of the plating sludge, dust and scale, and the resulting mixture was added with water to adjust the water content of the mixture to 10.8% by weight. The mixture was fully kneaded, and the homogeneously kneaded mixture was molded into a briquet by means of an agglomerating machine.

The mixing ratio of the above described various raw materials and additives are shown in the Table 4, and the molding condition and the property of the molded briquet are shown in the following Table 5.

Table 4

| | Plating sludge | Dust formed in electric furnace | Coke Scale | Waste liquor freeze | of pulp |
|---|---|---|---|---|---|
| Mixing ratio (parts) | 100 | 50 | 30 | 10 | 10 |

Note:
Mixing ratio is calculated in dry basis.

Table 5

| Molded amount (kg) | Molding pressure (kg/cm$^2$) | Crushing strength of molded briquet (kg/one briquet) |
|---|---|---|
| 20,000 | 4,000 | 45 |

Note:
Molded amount is calculated in dry basis.

The above obtained molded briquet was dried by a band type dryer used as a strength-improving machine. The drying condition and the strength of the dried briquet are shown in the following Table 6. The quality level of the dried briquet is shown in the following Table 7.

Table 6

| Drying temperature (° C) | Drying time (min) | Surface temperature of briquet at the drying (° C) | Crushing strength of dried briquet (kg/one briquet) |
|---|---|---|---|
| 350 | 85 | about 70 | 63 |

Table 7

| Fixed C (%) | Total Cr (%) | Total Ni (%) | Total Fe (%) | CaO (%) | SiO$_2$ (%) | MgO (%) | Al$_2$O$_3$ (%) | P (%) | S (%) | Zn (%) |
|---|---|---|---|---|---|---|---|---|---|---|
| 3.9 | 9.7 | 5.2 | 30.8 | 6.1 | 8.6 | 1.4 | 2.1 | 0.07 | 0.4 | 0.46 |

Note:
(1) "%" means % by weight based on the dry weight of briquet exclusive of water.
(2) The balance of the sum of the ingredients is the amount of oxygen bonded to elements other than Ca, Si, Mg and Al.

The above dried briquet was charged into a Girod furnace, the details of which were shown in Table 8, togehter with a theoretically necessary amount of coke breeze as a carbonaceous reducing agent and lime as a flux, and the resulting mixture was subjected to a dry system reduction smelting in the furnace.

Table 8

| Capacity of transformer | (KVA) | 55 |
|---|---|---|
| Inner diameter of furnace (upper portion) | (mm) | 350 |
| Inner diameter of furnace (lower portion) | (mm) | 250 |
| Depth of furnace | (mm) | 330 |
| Secondary voltage | (V) | 27.5 |
| Secondary current | (A) | 1,810 |

The reduction condition, the quality level of the recovered metal and the recovered percentage of Ni, Fe and Cr are shown in the following Tables 9, 10 and 11, respectively.

Table 9

| Amount of briquet used (kg) | Amount of coke breeze used (kg) | Amount of lime used (kg) | Unit of electric power (KWH/metal·ton) |
|---|---|---|---|
| 10,000 | 1,380 | 175 | 2,620 |

Table 10

| C (%) | Si (%) | Mn (%) | P (%) | S (%) | Ni (%) | Cr (%) | Fe and others (%) |
|---|---|---|---|---|---|---|---|
| 3.82 | 1.13 | 0.98 | 0.126 | 0.089 | 10.3 | 18.8 | 64.755 |

Table 11

| Ni(%) | Fe(%) | Cr(%) |
|---|---|---|
| 99.3 | 97.6 | 89.9 |

As described above, Ni, Fe and Cr were recovered in a high percentage of 99.3%, 97.6% and 89.9%, respectively. The recovered metal was low in the phosphorus content, and was able to be used as a part of raw material in the production of SUS 304. That is, the recovered metal was not at all different from commonly used ferroalloy and was able to be used as a raw material for stainless steel.

While, the slag, which remained after the metal was recovered, was composed of hard nonmetal oxides, and the crushed slag was able to be used as an aggregate. Moreover, the dust formed during the melting and smelting of the briquet in the Girod furnace contained Zn in a high concentration, and the dust was able to be used as a Zn source of raw material.

EXAMPLE 2

Thirty parts by weight in 100 parts by weight of the same plating sludge having a water content of 7.2% by weight as used in Example 1 was replaced by 30 parts by weight of a pickling sludge having a water content of 5.6% by weight, which had been obtained by dehydrating and drying a hydrated pickling sludge formed in the pickling step of stainless steel and having a chemical composition shown in the following Table 12.

Table 12

| Total Cr (%) | Total Ni (%) | Total Fe (%) | CaO (%) | $SiO_2$ (%) | MgO (%) | $Al_2O_3$ (%) | P (%) | S (%) |
|---|---|---|---|---|---|---|---|---|
| 9.8 | 2.1 | 33.6 | 8.8 | 3.2 | 0.25 | 1.88 | 0.02 | 0.45 |

Note:
(1) "%" means % by weight based on the dry weight of pickling sludge exclusive of water.
(2) The balance of the sum of the ingredients is the amount of oxygen bonded to elements other than Ca, Si, Mg and Al.

The above obtained mixture of the plating sludge and the pickling sludge was added with the same dust, scale, coke breeze and binder as those described in Table 4 of Example 1 in the same mixing ratio shown in the Table 4, and further added with water to adjust the water content of the resulting mixture to 10.8% by weight. The resulting mixture was fully kneaded, and the homogeneously kneaded mixture was molded into a briquet by means of an agglomerating machine.

The molding condition and the property of the molded briquet are shown in the following Table 13.

Table 13

| Molded amount (kg) | Molding pressure (kg/cm$^2$) | Crushing strength of molded briquet (kg/one briquet) |
|---|---|---|
| 20,000 | 4,000 | 44.5 |

Note:
The molded amount is calculated in dry basis.

The above obtained briquet was dried in the same manner as described in Example 1 by a band type dryer used as a strength-improving machine. The dried briquet had a crushing strength of 60 kg/one briquet, and a quality level shown in the following Table 14.

Table 14

| Fixed C (%) | Total Cr (%) | Total Ni (%) | Total Fe (%) | CaO (%) | $SiO_2$ (%) | MgO (%) | $Al_2O_3$ (%) | P (%) | S (%) | Zn (%) |
|---|---|---|---|---|---|---|---|---|---|---|
| 3.76 | 9.5 | 5.1 | 31.1 | 8.2 | 6.9 | 1.2 | 1.8 | 0.05 | 0.7 | 0.38 |

Note:
(1) "%" means % by weight based on the dry weight of briquet exclusive of water.
(2) The balance of the sum of the ingredients is the amount of oxygen bonded to elements other than Ca, Si, Mg and Al.

The dried briquet was charged into the same Girod furnace as used in Example 1 together with a theoretical necessary amount of coke breeze as a carbonaceous reducing agent and lime as a flux, and the resulting mixture was subjected to a dry system reduction smelting therein. The reduction condition, the quality level of the recovered metal, and the recovered percentage of Ni, Fe and Cr are shown in the following Tables, 15, 16 and 17, respectively.

Table 15

| Amount of briquet used (kg) | Amount of coke breeze used (kg) | Amount of lime used (kg) | Unit of electric power (KWH/metal·ton) |
|---|---|---|---|
| 10,000 | 1.042 | 82 | 2,590 |

Table 16

| C (%) | Si (%) | Mn (%) | P (%) | S (%) | Ni (%) | Cr (%) | Fe and others (%) |
|---|---|---|---|---|---|---|---|
| 4.0 | 1.16 | 1.08 | 0.113 | 0.092 | 10.1 | 18.2 | 65.255 |

Table 17

| Ni(%) | Fe(%) | Cr(%) |
|---|---|---|
| 99.2 | 97.5 | 88.8 |

As described above, Ni, Fe and Cr were recovered in a high percentage of 99.2%, 97.5% and 88.8%, respectively. The recovered metal was low in the phosphorus content and was not at all different from commonly used ferroalloy and was able to be used as a raw material for stainless steel.

While, nonmetal oxides, which remained after the metal was recovered, was able to be used as an aggregate. Moreover, the dust formed in the Girod furnace contained Zn in a high concentration and was able to be used as a Zn source of raw material.

EXAMPLE 3

Portland cement and water were added to the same plating sludge having a water content of 7.2% by weight, dust formed in electric furnace, scale and coke breeze as used in Example 1 to adjust the water content of the resulting mixture to 30% by weight. The mixture was kneaded by means of a kneader, and the homogeneously kneaded mixture was molded into a briquet by means of an agglomerating machine.

The chemical composition of the Portland cement used above is shown in the following Table 18. The above described various raw materials and additives were mixed in four mixing ratios (A), (B), (C) and (D) shown in the following Table 19.

Table 18

| CaO(%) | $SiO_2$(%) | MgO(%) | $Al_2O_3$ (%) | Total Fe(%) |
|---|---|---|---|---|
| 65.7 | 20.8 | 1.2 | 4.8 | 2.0 |

Note:
"%" means % by weight calculated in dry basis.

Table 19

| | Plating sludge | Dust formed in electric furnace | Scale | Coke breeze | Portland cement |
|---|---|---|---|---|---|
| Mixing ratio (parts) | | | | | |
| (A) | 100 | 10 | 10 | 5 | 10 |
| (B) | 100 | 50 | 50 | 10 | 40 |
| (C) | 100 | 100 | 100 | 20 | 70 |

Table 19-continued

| | Plating sludge | Dust formed in electric furnace | Scale | Coke breeze | Portland cement |
|---|---|---|---|---|---|
| (D) | 100 | 200 | 100 | 40 | 100 |

Note:
Mixing ratio is calculated in dry basis.

The resulting four kinds of briquets were subjected to a natural curing at room temperature, and then on the 3rd and 7th days the crushing strength of the briquets was measured to obtain a result shown in the following Table 20. The quality level of the briquets is shown in the following Table 21.

Table 20

| | Crushing strength (kg/cm$^2$) | |
|---|---|---|
| | on the 3rd day | on the 7th day |
| (A) | 92 | 147 |
| (B) | 117 | 175 |
| (C) | 131 | 211 |
| (D) | 173 | 238 |

Table 21

| | Fixed C (%) | Total Cr (%) | Total Ni (%) | Total Fe (%) | CaO(%) | SiO$_2$ (%) |
|---|---|---|---|---|---|---|
| A | 2.9 | 2.6 | 15.4 | 7.9 | 7.9 | 20.0 |
| B | 3.1 | 4.6 | 8.8 | 16.7 | 15.7 | 16.3 |
| C | 4.0 | 5.5 | 6.1 | 20.7 | 18.0 | 13.3 |
| D | 5.8 | 5.0 | 4.5 | 19.2 | 20.8 | 12.1 |
| | (MgO(%)) | Al$_2$O$_3$(%) | P(%) | S(%) | Zn(%) | Cu(%) |
| A | 1.7 | 2.5 | 0.23 | 0.36 | 0.3 | 0.06 |
| B | 2.8 | 2.2 | 0.13 | 0.34 | 0.2 | 0.03 |
| C | 3.3 | 1.9 | 0.09 | 0.34 | 0.1 | 0.02 |
| D | 4.5 | 1.9 | 0.07 | 0.41 | 0.1 | 0.01 |

Note:
(1) "%" means % by weight based on the dry weight of briquet exclusive of water.
(2) The balance of the sum of ingredients is the amount of oxygen bonded to elements other than Ca, Si, Mg and Al.

As described above, in the method of treating plating sludge according to the present invention, a plating sludge consisting of a hydrated plating sludge, which has been formed at the treating of a waste liquor of various metal platings, alone or, if necessary, in admixture with a hydrated pickling sludge is mixed with dust and scale, which have been formed during the stainless steel-making step; the resulting mixture is molded into a briquet; the brituqt is subjected to a reduction smelting together with a carbonaceous reducing agent to convert the plating sludge into a harmless product having a low phosphorus content; and the product is used as a raw material for ferroalloy or a metal is recovered from the product and is again used. The recovered metal has a low phosphorus content and can be used as a raw material for steel alloy. Therefore, the method of the present invention is effective for resource saving. Moreover, nonmetal oxide, which remains after metal is recovered, can be used as an aggregate, and when dust formed during the reduction of briquet in the reduction-smelting furnace is gathered, the dust can be used as a Zn source of raw material. Further, the method of the present invention is very simple and can be easily carried out. Therefore, the present invention is very excellent in the resource saving and prevention of public nuisance and is very valuable in industry.

What is claimed is:

1. A method of treating a plating sludge comprising mixing 100 parts by weight of a plating sludge, whose water content is decreased to not higher than 10% by weight, with 10–100 parts by weight of scale, 10–200 parts by weight of dust, both of the scale and dust being formed in the production of alloy steel, 10–100 parts by weight of a binder, and not larger than 40 parts by weight of a carbonaceous material; further adding 10–200 parts by weight of water to the resulting mixture to adjust the water content of the mixture to 7–30% by weight; kneading fully the mixture; molding the homogeneously kneaded mixture into a briquet by means of a briquet-molding machine; subjecting the briquet to a strength-improving treatment to use the above treated briquet as a raw material for ferroalloy.

2. A method of treating a plating sludge according to claim 1, wherein said plating sludge having a water content of not higher than 10% by weight is produced by dehydrating and drying a hydrated plating sludge alone, which is obtained from a waste liquor or metal plating.

3. A method of treating a plating sludge according to claim 1, wherein said plating sludge having a water content of not higher than 10% by weight is produced by mixing a hydrated plating sludge obtained from a waste liquor of metal plating with a hydrated pickling sludge, and dehydrating and drying the resulting mixture.

4. A method of treating a plating sludge according to claim 1, wherein said plating sludge is produced by mixing a plating sludge having a water content of not higher than 10% by weight, which is obtained by dehydrating and drying a hydrated plating sludge obtained from a waste liquor of metal plating, with a pickling sludge having a water content of not higher than 10% by weight, which is obtained by dehydrating and drying a hydrated pickling sludge.

5. A method of treating a plating sludge according to claim 1, wherein said binder is at least one member selected from the group consisting of pulp waste liquor, bentonite, molasses and CMC, and said strength-improving treatment is a drying treatment.

6. A method of treating a plating sludge according to claim 1, wherein said binder is cement and said strength-improving treatment is a natural curing at room temperature or a steam curing.

7. A method of treating a plating sludge according to claim 1, wherein said carbonaceous material is at least one member selected from the group consisting of coal powder and coke breeze.

8. A method of treating a plating sludge comprising mixing 100 parts by weight of a plating sludge, whose water content is decreased to not higher than 10% by weight, with 10–100 parts by weight of scale, 10–200 parts by weight of dust, both of the scale and dust being formed in the production of alloy steel, 10–100 parts by weight of a binder, and not larger than 40 parts by weight of a carbonaceous material; further adding 10–200 parts by weight of water to the resulting mixture to adjust the water content of the mixture to 7–30% by weight; kneading fully the mixture; molding the homogeneously kneaded mixture into a briquet by means of a briquet-molding machine; subjecting the briquet to a strength-improving treatment; charging the above treated briquet into a reduction-smelting furnace together with a carbonaceous reducing agent; subjecting the mixture to a reduction smelting in the furnace to recover metal for use as a raw material for alloy steel.

9. A method of treating a plating sludge according to claim 8, wherein said plating sludge having a water content of not higher than 10% by weight is produced by dehydrating and drying a hydrated plating sludge alone which is obtained from a waste liquor of metal plating.

10. A method of treating a plating sludge according to claim 8, wherein said plating sludge having a water content of not higher than 10% by weight is produced by mixing a hydrated plating sludge obtained from a waste liquor of metal plating with a hydrated pickling sludge, and dehydrating and drying the resulting mixture.

11. A method of treating a plating sludge according to claim 8, wherein said plating sludge is produced by mixing a plating sludge having a water content of not higher than 10% by weight, which is obtained by dehydrating and drying a hydrated plating sludge obtained from a waste liquor of metal plating, with a pickling sludge having a water content of not higher than 10% by weight, which is obtained by dehydrating and drying a hydrated pickling sludge.

12. A method of treating a plating sludge according to claim 8, wherein said binder is at least one member selected from the group consisting of pulp waste liquor, bentonite, molasses and CMC, and said strength-improving treatment is a drying treatment.

13. A method of treating a plating sludge according to claim 8, wherein said binder is cement and said strength-improving treatment is a natural curing at room temperature or a steam curing.

14. A method of treating a plating sludge according to claim 8, wherein said carbonaceous material is at least one member selected from the group consisting of coal powder and coke breeze.

15. A method of treating a plating sludge according to claim 8, wherein said carbonaceous reducing agent is at least one member selected from the group consisting of charcoal and coke.

16. A method of treating a plating sludge according to claim 8, wherein the reduction-smelting of the briquet is effected in the presence of the carbonaceous reducing agent and a flux.

* * * * *